United States Patent
Quentin et al.

(10) Patent No.: US 12,217,265 B2
(45) Date of Patent: Feb. 4, 2025

(54) METHOD FOR DETERMINING AN ASSOCIATION BETWEEN A BANKCARD AND A COMMUNICATIONS TERMINAL, DEVICE, SYSTEM AND CORRESPONDING PROGRAM

(71) Applicant: BANKS AND ACQUIRERS INTERNATIONAL HOLDING, Paris (FR)

(72) Inventors: Pierre Quentin, Enghien les Bains (FR); Marc Beunardeau, Paris (FR); Slim Jabberi, Tunis (TN); Vincent Roux, Saint-Cyr-L'École (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 443 days.

(21) Appl. No.: 16/961,473

(22) PCT Filed: Jan. 11, 2019

(86) PCT No.: PCT/EP2019/050715
§ 371 (c)(1),
(2) Date: Jul. 10, 2020

(87) PCT Pub. No.: WO2019/138086
PCT Pub. Date: Jul. 18, 2019

(65) Prior Publication Data
US 2020/0342461 A1      Oct. 29, 2020

(30) Foreign Application Priority Data

Jan. 12, 2018   (FR) ........................................ 1850278

(51) Int. Cl.
*G06Q 20/40*        (2012.01)
*G06Q 20/32*        (2012.01)

(52) U.S. Cl.
CPC ......... *G06Q 20/4093* (2013.01); *G06Q 20/32* (2013.01); *G06Q 20/40145* (2013.01); *G06Q 20/4016* (2013.01)

(58) Field of Classification Search
None
See application file for complete search history.

(56) References Cited

U.S. PATENT DOCUMENTS 8,028,896 B2 * 10/2011 Carter ................... G06Q 50/188
                                                              705/17
9,697,511 B2    7/2017 Naccache
(Continued)

FOREIGN PATENT DOCUMENTS

FR              2940567 A1    6/2010
WO    WO-2005073934 A1 *  8/2005    ............. G06Q 20/20
WO         2010043722 A1    4/2010

OTHER PUBLICATIONS

Shrestha, B., "Context-enhanced Mobile Device Authorization and Authentication", University of Alabama at Birmingham, ProQuest No. 10149575 (2016). (Year: 2016).*

(Continued)

*Primary Examiner* — Clay C Lee
(74) *Attorney, Agent, or Firm* — David D. Brush; Westman, Champlin and Koehler, P.A.

(57) ABSTRACT

A method for determining an association between a bankcard identifier and at least one mobile communications terminal identifier. The method is implemented by an electronic device and includes: obtaining an identifier of a current bankcard, a bankcard used to make a purchase of an article or a service by using a payment terminal, the obtaining being implemented at the time of the execution of a payment transaction made by using the bankcard; at least one step of obtaining a piece of data representative of at least one communications terminal identifier; and computing a (Continued)

score of correspondence between bankcard identifier and the at least one piece of data representative of a communications terminal identifier.

8 Claims, 2 Drawing Sheets

(56) References Cited

U.S. PATENT DOCUMENTS

| | | | | |
|---|---|---|---|---|
| 10,614,445 | B1* | 4/2020 | Dorsey | G06Q 20/10 |
| 11,250,431 | B2* | 2/2022 | Gerard | G06Q 20/3223 |
| 11,308,481 | B1* | 4/2022 | Thomas | G06Q 20/4012 |
| 2014/0074696 | A1* | 3/2014 | Glaser | G06K 19/06196 |
| | | | | 726/19 |
| 2015/0317626 | A1* | 11/2015 | Ran | G06Q 20/3278 |
| | | | | 705/76 |
| 2016/0071105 | A1* | 3/2016 | Groarke | G06Q 50/01 |
| | | | | 705/44 |
| 2016/0219411 | A1* | 7/2016 | Tenant de la Tour | |
| | | | | H04W 4/029 |
| 2017/0070527 | A1* | 3/2017 | Bailey | G06F 21/316 |
| 2017/0311160 | A1* | 10/2017 | Feng | H04B 5/72 |
| 2017/0357981 | A1* | 12/2017 | Azzam | G06Q 20/204 |

OTHER PUBLICATIONS

International Search Report and Written Opinion dated Mar. 4, 2019 for corresponding International Application No. PCT/EP2019/050715, filed Jan. 11, 2019.

English translation of the Written Opinion of the International Searching Authority dated Jul. 14, 2020 for corresponding International Application No. PCT/EP2019/050715, filed Jan. 11, 2019.

Preliminary Search Report for French Application No. 1850278, dated Sep. 7, 2018.

\* cited by examiner

METHOD FOR DETERMINING AN ASSOCIATION BETWEEN A BANKCARD AND A COMMUNICATIONS TERMINAL, DEVICE, SYSTEM AND CORRESPONDING PROGRAM

CROSS-REFERENCE TO RELATED APPLICATIONS

This Application is a Section 371 National Stage Application of International Application No. PCT/EP2019/050715, filed Jan. 11, 2019, which is incorporated by reference in its entirety and published as WO 2019/138086 A1 on Jul. 18, 2019, not in English.

1. FIELD OF THE INVENTION

The invention relates to the field of payment. More particularly, the invention relates to the implementation of payment transactions within physical retail space (an independent store, a shopping mall, a supermarket). The invention relates more particularly to increasing the security of payment transactions conducted within these establishments.

2. PRIOR ART

The decade that has just elapsed has been undoubtedly marked by the advent of smart communications terminals, also known as smartphones, which have completely transformed the behaviors of users in numerous fields of daily life. In 2017, nearly two billion payment terminals were sold throughout the world. Among the changes that took place, we can cite especially modes of payment of goods and services, especially in stores.

Indeed, it is now possible, through these communications terminals, to make payments without using bankcards. To this end, however, the communications terminal in question must, in most cases, have a specific communications interface called a contactless interface, mainly of the NFC (near-field communications) type. In using this communications interface to make a payment, the user's terminal is brought closer to the payment terminal and an NFC data exchange is then implemented. During this exchange, the user's communications terminal behaves like a bankcard and transmits data to the payment terminal. More particularly, during this exchange, the communications terminal transmits a bankcard number, a date of validity, a bearer number (or data derived from these basic data).

The payment terminal receives this data and processes the payment transaction (often with reference to one or more payment servers, or transactional servers), to debit the amount corresponding to the purchases from the user's bank account.

This manner of carrying out a payment (or other variants involving data transmission by the user's communications terminal) have been described in the literature and are currently implemented by certain communications terminals and certain payment terminals. Now, the problem is situated precisely in terms of adopting this type of payment technique. Indeed, to be able to implement this type of payment technique, several prerequisites are needed.

The first prerequisite is at the technical level, on the communications terminal side: it is generally necessary (or even indispensable) for the communications terminal to embed a module for the sending/transmission of NFC data. Now this type of module, all told, equips only a fairly limited proportion of payment terminals. Indeed, numerous terminal manufacturers are fairly strict in selecting the models of terminals that embed such transmission modules. For example, the least expensive models of terminals generally lack an NFC interface, and that makes this model of terminal actually unsuited to the practice of contactless payment in a store.

A second prerequisite, which is also situated in the communications terminal, relates to the securing of bankcard data. Indeed, during the implementation of the payment, the bankcard data (or the data resulting from this bankcard data) are transmitted to the payment terminal. The data are generally extracted from the communications terminal, which must save these data permanently and provide for their security. To this end, the communications terminal must have a secured execution environment known as a trusted execution environment (TEE) and/or a specific secure element (SE). Now, once again, this type of technology is very often reserved for upmarket communications terminals and therefore to terminals beyond the (financial) reach of most users.

A third prerequisite, of lesser importance, relates to the necessity for the user to have available an active data connection on his communications terminal: the implementation of a payment transaction by means of a communications terminal indeed often requires that the terminal should be able to validate this transaction with one or more servers, which implies that the terminal should be capable of carrying out an exchange of data with this server or these servers. Now, such data connections can be costly and the users do not necessarily subscribe to them. This connection can be provided by the merchant (this is the case with large shopping malls for example) but this is not always the case.

The fact is that these prerequisites are limiting the growth of payments by communications terminals on merchants' premises. The limiting of this growth is a problem for two main reasons: the first relates to the speed of payment when it is done by means of a mobile terminal (this speed is synonymous with fluidity for the merchant and therefore for customer satisfaction); the second is the general securing of the payment transaction: since the user does not use his bankcard and since the terminal securely stores the data of this card, the risk of theft of the bankcard data during purchases with merchants is greatly reduced thus limiting, for practical purposes, the consequences of these thefts.

There is therefore a need to provide a method of payment with merchants that brings into play the user's communications terminal while at the same time averting the problems raised by the use of specific communications interfaces.

3. SUMMARY OF THE INVENTION

The present technique has been developed in keeping in mind the problems and issues referred to earlier. More particularly, the present technique enables payments to be made by means of the user's mobile terminal while at the same time eliminating the technological prerequisites mentioned here above and improving the security of the payment transactions made with merchants.

More particularly, a method is described for determining an association between a bankcard identifier and at least one mobile communications terminal identifier, a method implemented by an electronic device, characterized in that it comprises:
   a step for obtaining an identifier of a current bankcard, a bankcard used to carry out a purchase of an article or a service by means of a payment terminal, said step for obtaining being implemented at the time of the execution of a payment transaction made by means of said bankcard;

at least one step for obtaining a piece of data representative of at least one communications terminal identifier;

a step for computing a score of correspondence between said bankcard identifier and said at least one piece of data representative of a communications terminal identifier.

Thus the invention makes it possible, gradually (or not gradually, depending on the embodiments) to obtain data that determine scores of correspondence between portable telephone identifiers or other communications terminal identifiers available to users (who pass through merchants' shops) with bankcard identifiers (payment cards, debit cards, credit cards). Once the scores of correspondence are obtained (and "stabilized"), the security of the bank transactions conducted by the merchant can be greatly improved.

According to one particular characteristic, the step for obtaining a piece of data representative of at least one communications terminal identifier is concomitant with the time of execution of the payment transaction made by means of said bankcard.

According to one particular embodiment, the step for obtaining a piece of data representative at least one communications terminal identifier comprises:

a step for sending an inquiry request addressed to a plurality of communications devices, by means of a wireless communications interface;

a step for receiving at least one response corresponding to the inquiry request, coming from at least one communications device corresponding to said request, said response comprising a communications terminal identifier.

According to one particular characteristic, said at least one response furthermore comprises a signal power value.

According to one particular characteristic, the step for obtaining a piece of data representative of at least one communications terminal identifier furthermore comprises a step for anonymizing said communications terminal identifier, delivering said piece of data representative of the communications terminal identifier.

According to one particular embodiment, the step for computing the score of correspondence comprises a step for updating a state of correspondence in which occurrences of data representative of communications terminal identifiers are counted and recorded.

According to one particular characteristic, the step for computing the score of correspondence comprises, for a piece of data representative of a communications terminal identifier called a current terminal identifier:

a step of searching, within a data structure, for a record corresponding to the current terminal identifier, called a current record; and when said current identifier is found in the data structure, a step of updating said record, comprising:

the incrementing of a total number (AC) of transactions during which said current identifier has been obtained;

the addition or the modification of a sub-record corresponding to a total number (AB) of transactions during which said current terminal identifier has been obtained for said current bankcard identifier;

a step of updating the score of correspondence of the current bankcard identifier with the current terminal identifier by computing the ratio AB/AC.

According to one particular embodiment, the addition or the modification of a sub-record corresponding to a total number of transactions furthermore comprises a power of reception of a response to an inquiry request, the request being transmitted by means of a wireless communications interface.

Thus, this technique can be implemented by means of devices already present with the merchants and not requiring any particular adaptation on their part.

The present technique also relates to an electronic device for determining an association between a bankcard identifier and at least one mobile communications terminal identifier, characterized in that it comprises:

means for obtaining a current bankcard identifier, the bankcard being used to make a purchase of an item or a service by means of a payment terminal, these means being implemented at the time of execution of a payment transaction made by means of said bankcard;

means for obtaining at least one piece of data representative of at least one communications terminal identifier;

means for computing a score of correspondence between said bankcard identifier and said at least one piece of data representative of a communications terminal identifier.

According to a preferred implementation, the different steps of the method according to the proposed technique are implemented by one or more software programs or computer programs, comprising software instructions that are intended to be executed by a data processor according to the proposed technique and are designed to control the execution of the different steps of the methods.

The proposed technique is therefore also aimed at providing a program liable to be executed by a computer or by a data processor, this program comprising instructions to command the execution of the steps of a method as mentioned here above.

This program can use any programming language whatsoever and can take the form of source code, object code or intermediate code between source code and object code such as in a partially compiled form or in any other desirable form whatsoever The proposed technique is also aimed at providing an information carrier or medium readable by a computer, and comprising instructions of a program as mentioned here above.

The information carrier can be any entity or device whatsoever capable of storing the program. For example, the carrier or medium can comprise a storage means such as a ROM, for example, a CD ROM or microelectronic circuit ROM or again a magnetic recording means, for example a floppy disk or a hard disk drive.

Besides, the information carrier can be to a transmissible carrier such as an electrical or optical signal, that can be conveyed by an electrical or optical cable, by radio or by other means. The program according to the invention can especially be uploaded to an Internet type network.

As an alternative, the information medium can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc)).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, a smart card, a memory card, an electronic board for the execution of firmware etc.

Each component of the system described here of course implements its own software modules.

The different embodiments mentioned here above as well as the different characteristics that constitute them can be combined with one another to implement the proposed technique.

4. FIGURES

Other features and advantages of the invention shall appear more clearly from the following description of several particular embodiments, given by way of simple illustratory and non-exhaustive examples and from the appended drawings, of which.

5. DESCRIPTION

5.1 Reminders of the Principle

As explained here above, the general principle of the technique described consists in determining the scores of correspondence between bankcard data, used during the payment transaction, and identifiers of communications terminals present during this transaction. Here below and here above, reference is made to the bankcard as a payment means. It is clear that any other appropriate means of payment can be the object of the present application, starting with the user's communications terminal when it is used as a payment means.

The scores of correspondence make it possible, with a sufficient trust rate, to determine that a given bankcard corresponds to a given communications terminal. By means of this unique association, it is therefore possible, within a shop (or a more globalized retail space) to determine that a user (possessing the terminal, the identifier of which has been recognized) is also the user in possession of the bankcard (the identifier of which has also been recognized). In terms of payment technique, the establishment of this user identity for these two pieces of information make it possible to implement a novel payment method using a communications terminal, a method that requires neither the use of the communications terminal nor that of the user's bankcard.

This payment method is briefly described here below.

First of all, however, the technique relates to the establishment of scores of correspondence of association between the bankcard identifiers and the communications terminal identifiers.

According to the present invention, these two sets of data are collected in a shop or a retail space chiefly (but not exclusively) when payments are being made through bankcards (or other equivalent payment means). The association in itself is made in going with the flow, i.e. as and when the transactions are made. Thus, with a few exceptions, the bankcard/communications terminal association is not immediate but rather it is gradual, depending on the payments made (it can be done over several days, weeks or months, essentially depending on the frequency with which the user makes a payment with his bankcard in a shop or a more global retail space).

The main problem of the association lies in the elimination of parasitic terminal identifiers, starting with the identifiers of shop employees (or those of the merchant himself if he is the sole salesman) and the identifiers of communications terminals of other users who are present but do not participate in the transaction. This is why, in general, the association is determined by using lists of identifiers of communications terminals that are present during the implementing of the transaction and lists of communications terminals that are present (independently of their participation in the implementing of a transaction) during a predefined period of time, for example a day (a week, a month, a year).

Figure 1:
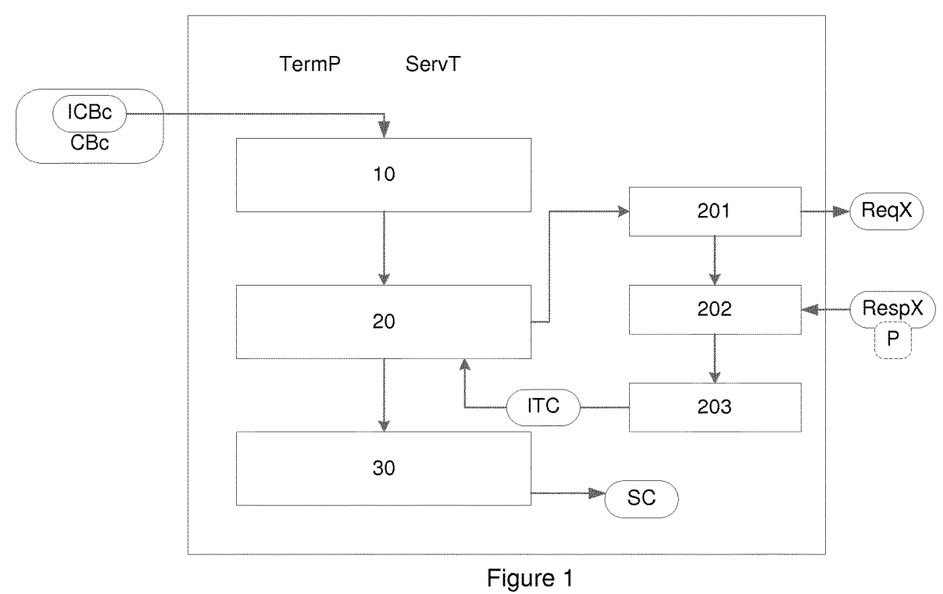
FIG. 1 presents the different processing steps of the present technique.

More particularly, with reference to FIG. 1, a method is described for determining an association between a bankcard identifier and at least one mobile communications terminal identifier, a method implemented by an electronic device (for example a payment terminal TermP and/or a transactional server ServT), the method comprises:

- a step (10) for obtaining an identifier of a current bankcard (ICBC), a bankcard (CBc) used to carry out a purchase of an article or a service by means of a payment terminal (TermP), this step for obtaining (10) being implemented at the time of the execution of a payment transaction made by means of the bankcard (CBc);
- at least one step of obtaining (20) a piece of data representing at least one communications terminal identifier (ITC); this step can be implemented continuously or occasionally; in one variant, the step for obtaining (20) is concomitant with the time of execution of the payment transaction made by means of the bankcard;
- a step of computation (30) of a score of correspondence (SC) between the bankcard identifier (ICBC) and the data representative of a communications terminal identifier (ITC). Depending on the operational conditions, the step for obtaining (20) the piece of data representing at least one communications terminal identifier (ITC) comprises:
- a step for sending (201) an inquiry request (ReqX) addressed to a plurality of communications devices, by means of a wireless communications interface (these are all the devices potentially in the area covered by a broadcast type request);
- a step of reception (202) of at least one response (RespX) corresponding to the inquiry request, coming from the at least one communications device responding to the request, the response comprising a communications terminal identifier; the response (RespX) can also include, in addition, a signal power value (P); when the power of the response signal is situated below a predetermined threshold, it can be the case that this response (and the identifier that accompanies it) is not taken into account;

an step (203) for anonymizing the communications terminal identifier, delivering the piece of data representing the communications terminal identifier (ITC): this anonymizing can be done by means of a hashing technique.

The communications interfaces used are, by priority, those corresponding to the WiFi and/or Bluetooth standards. For greater security, both technologies (WiFi, Bluetooth) can be used to thus provide two different identifiers, representing one and the same communications terminal and associated with one and the same bankcard.

On the basis of the data collected, for each bankcard identifier a list is built of the associated mobile terminal identifiers and the corresponding scores of correspondence. In general, the higher the score of correspondence, the more plausible is it that the mobile terminal identifier and the associated bankcard identifier are associated and therefore that they represent one and the same physical person. When this score of correspondence is sufficient (i.e. when it surpasses a predetermined threshold, fixed for example between 85% and 95%), it is then possible to start implementing a an electronic payment procedure, i.e. one that does not require either the use of the bankcard or potentially the use of the user's communications terminal.

To this end, the initial procedure comprises the following steps when the score of correspondence is sufficient:

a step of transmission, for example to the merchant (taken in the broad sense) of a piece of information representing a correspondence between a bankcard identifier and a communications terminal identifier:

this transmission is carried out for example when the user possessing his bankcard and the communications terminal is on the merchant's premises and when he carries out a transaction, as usually, with his bankcard;

the merchant is informed that the score of correspondence of association of these two pieces of data represents an individual's identity;

the merchant then indicates to the user that he can opt for an electronic payment if he so wishes, and starts a procedure of registration in this sense (opt-in); the procedure does not necessitate the communication of the bankcard data because these data are already in the possession of the payment terminal to carry out the transaction in progress; only the complementary data are entered (for example family name, first name, and a photograph can also be obtained by the merchant).

in another embodiment, a specific application can be downloaded by the user on his communications terminal to enter these data and to do so even before implementing the score-of-correspondence technique without the merchant being aware of it; this application can also serve to authorize a payment that would be initiated by the merchant; the goal of this application is, so to speak, to prepare the possibility of carrying out an electronic payment subsequently;

whatever the embodiment, the data and more particularly the bankcard data are entrusted to a transactional server that records and associates the user's identity, possibly confirmed by the entry of data on identity (ID card photo and/or passport photo), with a communications terminal identifier.

Following this recording within the transactional server, the electronic payment method implemented is the following:

A user (associated and recorded) enters a retail space and wishes to make a purchase. A specific module of the cash register and/or the payment terminal obtains a communications terminal identifier (by the same mechanisms as those used to make the association between the payment means and the communications terminal), compares (or has compared) this data with the recorded and associated identifiers, and obtains a response (positive or negative). In the event of a positive response, the payment terminal and/or the cash register obtain data on a user's identity: the merchant is then capable of comparing these data with data that are presented by the user (ideally, this comparison can be limited to a visual comparison of the user's face with the recorded face—an identity photograph—and can be automatic (without any action by the merchant)). When the user's identity is confirmed, the merchant confirms the validation of the transaction on the basis of the data obtained (and especially the bankcard data) and does so without the user having to carry out an action with his bankcard or his communications terminal. Depending on the embodiments and the systems of implementation, the identity data obtained by the payment terminal and/or the cash register are transmitted from a transactional server which stores these data securely.

Depending on the embodiments, the user can implement a payment validating operation, especially by accepting the transaction on the basis of his communications terminal. In this example, some fluidity is lost as compared with the situation described here above but, as a trade-off, the user is reassured and maintains control over payments. The application used to validate this payment is then the same as the one used by the user to enter and record the identity data that concerns him. An operation to validate the payment can be implemented by the user in providing a piece of biometric payment validation information: in order to validate the payment, a payment terminal (or a cash register) having an interface to obtain the user's biometric data (fingerprint, iris, facial identity) can obtain the biometric data acquired and transmit these data (or a representation of these data) to the transactional server; the transactional server obtains this data from the payment terminal (or the cash register); then, from the PAN or the MAC, it retrieves (from an appropriate database), reference biometric data and compares these reference data with the data received. When the comparison is positive, the transaction is validated by the transactional server.

This procedure prevents fraudulent behavior by merchants who might wish to put through transactions as soon as a registered user comes into the retail space or the shop.

More particularly, in one preferred embodiment, a facial recognition module installed within the payment terminal or the cash register is in charge of obtaining a representation of the user's face at the time of the transaction. This facial recognition module is secure and connected to the security processor of the payment terminal (to make sure of the security of the recognition). It scans the user's face at the time of the transaction, i.e. during the purchase. This module is independent: it cannot be implemented manually by the merchant and is automatically activated in the event of payment by the method described here above. The data acquired (data on the face) are transmitted directly to the transactional server at the same time as the other transaction data without it being possible for the merchant to take action.

In any case, through the technique for computing the score of correspondence described in the present application, it is possible to implement a far simpler and more fluid payment operation than with known methods and to do so even for users who do not have very costly communications terminals at their disposal. Thus, through the technique described, it is possible to popularize payment by means of a communications terminal while at the same time preserving the security attributes of payments made by means of a bankcard.

Here below, we describe an embodiment of the technique for computing a correspondence score according to the present invention, enabling the association between the bankcard and the communications terminal and ultimately enabling payment as described here above.

5.2 Description of One Embodiment

In this embodiment, we describe the implementation of the previous method in a particular example. In this particular example, the bankcard identifier is constituted by a PAN (primary account number) or a PAN derivative (for example a hashed PAN). The utility of converting the PAN is that it enables data confidentiality of the information processed. In this particular case, the communications terminal identifier is constituted by a Bluetooth MAC (or a MAC derivative (such as for example a hashed MAC)). The utility of converting the MAC is also that it enables greater confidentiality of the method processed.

The state [E] designates a list of $(P_i, L_i)$, where $P_i$ is a PAN corresponding to a transaction, $L_i$ being a MAC list associated with this transaction (it is therefore a data structure that can take the form of a local or distant database). The list $L_i$ is constituted solely by MAC values obtained during the transaction (i.e. the PANs obtained with a time interval situated around the transaction). The method for obtaining PANs is described briefly here below. The state [E] is built naturally by the addition, to a current state $[E_{-1}]$, of a pair $(P_i, L_i)$ representing the time when the transaction is performed (with the PAN $P_i$, in adding $(P_i, L_i)$ to the current state $[E_{-1}]$). $L_i$ is the MAC list when the transaction is done. The addition of the pair $(P_i, L_i)$ can be done with the flow, as and when the operation progresses, throughout the execution of the transactions, or else on the contrary in a batch-processing operation performed subsequently to the implementing of the transactions, for example at the end of the day or at the end of the working period. Depending on the embodiments, this state can be pooled (i.e. it can be done by a server grouping together several retail areas or several stores distributed geographically at different locations) or else it can be done locally, for a single retail area or a single store. The advantage resulting from a pooling is ease of computation as explained here below.

As indicated in the reminder of the principle, from a state [E], for each PAN the list of associated MACs and the scores of correspondence are built. In this embodiment, the higher the score of correspondence, the more plausible is it that the MAC and the PAN will be associated and therefore that they will be representative of a same physical individual. In this embodiment, the score ranges from 0 to 1, 1 being a maximum value of the score and 0 being the minimum value.

Let AB represent the number of pairs (P,L) of the current state [E] for which a given MAC address M belongs to the list L; this number AB can be seen as the number of times that the MAC address M has been seen in the shop when a transaction is made with the PAN P;

Let AC be the list number L of the state [E] in which M belongs to L; this number AC can be seen as the number of times that the MAC address M has been seen in the store when a transaction is performed, independently of the PAN used for these transactions.

The state [E] can be constituted for example as follows:

| MAC# | AB | | |
| --- | --- | --- | --- |
| | PAN# | NB | AC |
| 5E:FF:56:A2:AF:15 | 123456789 | 2 | N |
| | 125366897 | 4 | |
| | 654988746 | 1 | |
| | ... | 1 | |
| 5E:F4:65:A0:AA:01 | 123456789 | 2 | 3 |
| | 125366897 | 1 | |
| 5E:F0:61:B2:14:A3 | 654988746 | 1 | 1 |

In this example, it is seen that the first MAC of the list appears for all the PANs (i.e. the sum of the NB values associated with each PAN is close (or even equal)) to the total number N of times that this MAC appears. On the contrary, the second MAC of the list appears in only three transactions: twice with the first PAN (123456789) and only once with the second PAN (125366897). The third MAC of the list appears in only one transaction.

Thus, the score of correspondence $Sc_{[P, M]}$ representative of the association of the PAN P with the MAC M in this embodiment is equal to: AB divided by AC.

For the third example (5E:F0:61:132:14:A3), this score of correspondence is equal to 1. For the second example (5E:F4:65:A0:AA:01), the score of correspondence is equal to $\frac{2}{3}$ for the PAN 123456789 and $\frac{1}{3}$ for the PAN 125366897. For the first example (5E:FF:56:A2:AF:15) the value of the score of correspondence is residual.

Depending on the embodiments, the correspondence shall be considered to be accurate from a correspondence threshold onwards. Ideally, the correspondence threshold is equal to 1. However, the correspondence threshold can be lowered as a function of operational implementations. Through this computation method, the complexity of determining the MAC/PAN association is reduced: in addition, the greater the score of correspondence, the greater the probability of association between the two MAC/PAN identifiers. On the contrary, the lower the score of correspondence, the lower is this probability. Typically, a low score of correspondence corresponds to a terminal identifier that occurs frequently (or often) in the transactions. This is therefore probably a piece of merchant equipment (merchant's communication terminal, or an employee's communications terminal, or any other permanent device of the retail area). Conversely, a communications terminal identifier that is little seen (ideally only once) is more likely to be associated with one and the same bankcard identifier, as is the case for the last example here above. Thus, the problems posed by recurrent devices that disturb the association process are resolved simply.

Among the additional characteristics to be considered according to certain alternative embodiments, the sub-records AB can also include the power of reception of the response to an inquiry request, to obtain the MAC addresses of the communications terminals. Thus, in addition to the number, the reception power of this signal can be taken into account to determine the scores. More particularly, when there are very numerous communications devices present in the retail area, this reception power for receiving the response to the inquiry request makes it possible to eliminate a large number of communications devices meeting this request: what is done is firstly to eliminate devices whose reception power is too low. This is especially useful in the context of retail areas such as supermarkets comprising numerous payment points (cash registers, payment terminals) and comprising a large number of users (many of whom could be paying for purchases simultaneously).

5.3 System of Implementation

Figure 2:
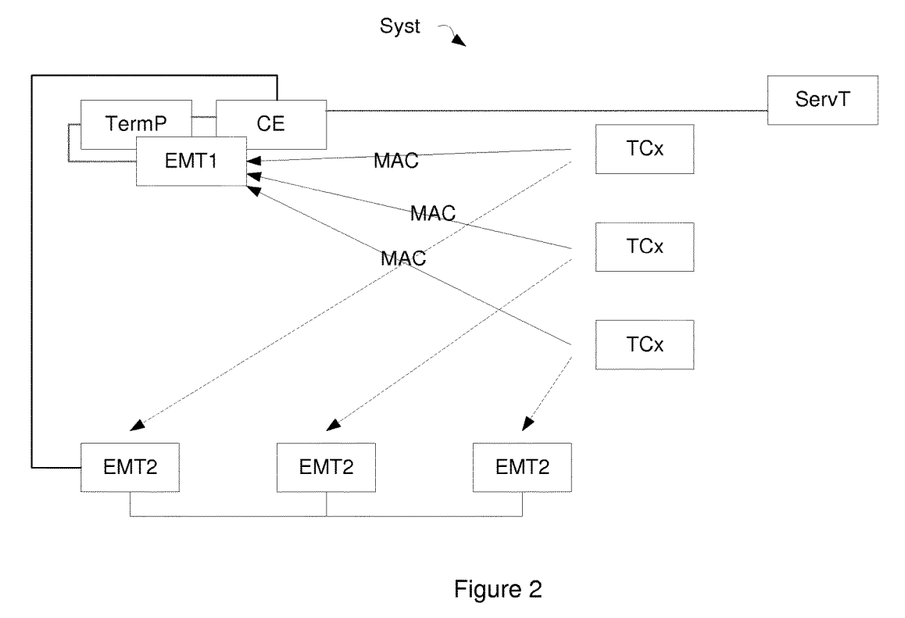
FIG. 2 presents a system in which the technique can be implemented.

Referring now to FIG. 2, we present a system (Syst) adapted to the implementing of the present technique. Such a system comprises, in this example, a payment terminal (TermP) connected or integrated with a cash register (CE). This payment terminal (TermP) and/or cash register (in case of integration) is, in addition to the usual functions, in charge of obtaining bankcard data of the users. Whenever a bankcard is used to carry out a payment, the payment terminal records the data of a bankcard or an identifier representing this data (also called a "token"), as has been described here above (for example a hashed PAN). The system furthermore comprises means for obtaining data to identify communications terminals (TCx). Typically, these means can take several forms. Two of them are described here below.

In a first form, the means (EMT) for obtaining identification data of communications terminals are integrated (EMT1) within the payment terminal and/or the cash register. These are communications interfaces of the Bluetooth interface/or WiFi interface type. Either of these two interfaces is used to obtain a MAC address type piece of identification data, as described here above. These MAC addresses are for example made anonymous (hashed) in order to create a unique identifier of the address.

In a second form, the means for obtaining communications terminals identification data (EMT2, ... ) are dispersed within the retail area or the store and form part of a set of sensors that are intended to follow and/or locate the users.

Two modes of obtaining MAC addresses can be envisaged (and can be combined depending on the embodiments). The first mode consists in an obtaining called contextual obtaining, i.e. an obtaining of the MAC addresses at the time of payment by means of a bankcard. In this contextual mode, the time of obtaining is therefore more or less synchronous with the time of obtaining bankcard data to make the payment. This is an advantageous mode because it restricts the collecting of terminal identifiers (addresses) to a precise time and place. More particularly, the communications module or modules implement the WiFi and/or Bluetooth communications interfaces which then collect only the MAC addresses of the devices in proximity to the payment terminal or the cash register: indeed, the payment terminal or the cash register is in a position to obtain the power value of the signal sent out by the communications terminal, a power value that is matched with the distance and this payment terminal relative to the payment terminal (or the cash register). This means that a power parameter can be used to exclude communications terminals whose signal power is too low and thus to limit the possibilities of association between the addresses of the communications terminal and the bankcard data. The advantage of this contextual mode of obtaining can also be obtained in a system in which sensors are external to the cash register or to the payment terminal. To implement a contextual mode, it is enough to define a reference sensor that would be in charge of reading the MAC addresses of the terminals more or less at the time of payment by bankcard and to use the data obtained (if necessary filtered by a power parameter depending on the distance of the reference center relative to the payment terminal with which the payment card is used). Another advantage of the contextual mode, when it is implemented with a payment terminal, lies in the fact that the technique of card/communications terminal association can be implemented without necessitating the additional adjoining of (often costly) equipment: it is enough to use the existing communications interfaces present in the payment terminal and/or present in the cash register.

The second mode consists of an obtaining that is called continuous obtaining, i.e. an obtaining of the MAC addresses throughout the period when the store is open. In this continuous mode, the identifiers of the mobile terminal are therefore collected, time-stamped and recorded permanently. This mode of collecting has the advantage of being complete: it is possible to have far more mobile terminal data while enabling a possible tracking and a possible locating of the users in the store (for example in a system in which the sensors are external and distributed in the store or the retail area). In this embodiment, it is thus possible to track and interpret the user's movements within the retail area while implementing the method of the invention to enable an association between the mobile terminal of this user and the bankcard that has served to make the purchases. In this continuous mode, the data that can be used by the merchant are therefore greater in number than they are in the contextual mode. However, this requires the availability of a system comprising more hardware and sensing modules (WiFi, Bluetooth) than in the contextual obtaining mode.

In the continuous mode, besides, the identifiers obtained are time-stamped to be thereafter associated with bankcard identifiers depending on the time of the transaction, thus making it possible to be more efficient and relevant in the computation of the scores of correspondence between these data. Thus, the data structure presented here above can furthermore contain a time associated with the bankcard identifier, this time being representative of the time of the transaction or the time of collecting identification data of the communications terminal.

The system also comprises means of processing to implement the method described here above. These means of processing are either local (TermP, CE, local server) or distant (ServT). When they are located within the retail area (therefore on premises), the processing means manage the data proper to the retail area and make it possible to determine the card/communications terminal associations as a function of the users of this retail area only.

Advantageously, the processing means are distant (ServT) and they implement the method described here above comprehensively. More particularly, the processing means are situated in a transactional server (or a group of transactional servers) that receives, from the payment terminals (and/or the cash registers) the bank transaction data that have to be implemented. In other words, when the processing means are distant, the method for computing scores of correspondence described here above can be implemented in taking account of a far greater quantity of collecting situations. This means that the computation of the scores of correspondence scores is more efficient than the case of a single retail area. Thus, for example, if a first transaction is made with a bankcard and if this first transaction is associated with X communications terminal identifiers and if a second transaction is made in another retail area and/or at a different time period (different by several minutes, hours or days) and if this second transaction is associated with Y identifiers, then it is then far more efficient to carry out a first filtering operation (even before computing a score of correspondence) between X and Y identifiers previously obtained for these two different transactions. Ideally, this filtering step makes it possible to obtain the solution without any need to compute a score of correspondence. At the very least, this filtering step limits the possibilities for the subsequent computation of the score of correspondence between the bankcard identifier and the communications terminal identifier.

Distant processing means do not necessarily imply that the state [E] is completely distant. For example, in one particular embodiment, the state is transmitted at the end of a period of activity of the business (the end of the day for example) and processed at a distance or remotely by the transactional server. The distant processing eliminates false positives or false negatives and provides an updated state to the retail area or to the business in response, namely an updated state in which only the correct PAN/MAC associations are preserved, a state in which the data are limited solely to data effectively collected up by the retail area: in other terms, the updated state does not comprise additional PAN/MAC data as compared with those obtained by the retail area itself.

5.4 Other Characteristics and Advantages

Figure 3:
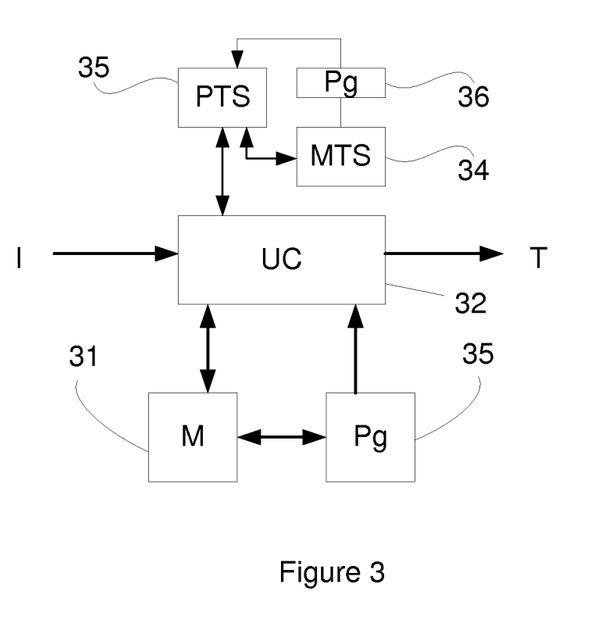
FIG. 3 describes an electronic implementing device according to one simplified embodiment.

Referring to FIG. 3, we describe a payment terminal (TP) implemented for the management of the association between a user's communications terminal and a payment means (such as a bankcard) according to the method described here above.

For example, the payment terminal (TP) comprises a memory 31 comprising for example a buffer memory, a general processor 32, equipped for example with a microprocessor and driven by a computer program 33 and/or a secure memory 34, a secure processor 35, driven by the computer program 36, these processing units implementing data-processing methods as described here above to carry out processing operations for associating payment means with communications terminals.

At initialization, the code instructions of the computer program 36 are for example loaded into a memory and then executed by the secure data processor 35. The data processor 35 inputs at least one piece of data representing a payment. The secure processor 35 implements the steps of the method described here above according to the instructions of the computer program 36 to obtain a piece of bankcard identification data and communications terminal identification data before the finalizing of the payment transaction.

To this end, the payment terminal (TP) comprises, in addition to the memory 34, communications means such as network communications modules, data-transmission means and data-transmission circuits for transmitting data between the various components of the terminal.

The means described here above can take the form of a particular processor implemented within a specific device implanted within the payment terminal (TP). According to one particular embodiment, the payment terminal (TP) implements a particular application that is in charge of the execution of the operations described here above, this application being for example provided by the manufacturer of the processor in question in order to enable the use of said processor. To this end, the processor comprises unique identification means. These unique identification means ensure the authenticity of the processor.

The invention claimed is:

1. A method for determining an association between a bankcard identifier and at least one mobile communications terminal identifier, the method being implemented by an electronic device and comprising:
    obtaining an identifier of a current bankcard used to make a purchase of an article or a service by using a payment terminal of a merchant, said obtaining being implemented at a time of execution of a payment transaction for the purchase made by using said current bankcard;
    obtaining at least one piece of data representative of at least one communications terminal identifier from at least one communications device, comprising:
        sending an inquiry request addressed to a plurality of communications devices located in the area covered by a broadcast type request from said payment terminal, by using a wireless communications interface corresponding to the WiFi and/or Bluetooth standards; and
        receiving at least one response corresponding to the inquiry request, coming from at least one communications device corresponding to said request, said response comprising the at least one communications terminal identifier of said communications device;
    computing a score of correspondence between said bankcard identifier and said at least one piece of data representative of said at least one communications terminal identifier based on a concomitance between the at least one received response and a time of obtaining the identifier of the current bankcard, said score of correspondence expressing a plausibility that said bankcard identifier and said at least one communications terminal identifier are associated with a user representing one and the same physical person;
    storing the score of correspondence between said bankcard identifier and said at least one piece of data representative of said communications terminal identifier in at least one non-transitory computer-readable medium for future use in a payment transaction between the payment terminal and a communication terminal belonging to the at least one communication terminal located in the area covered by a broadcast type request from said payment terminal; and
    transmitting a piece of information representing the score of correspondence to the merchant.

2. The method according to claim 1, wherein said at least one response furthermore comprises a signal power value.

3. The method according to claim 1, wherein obtaining at least one piece of data comprises anonymizing said at least one communications terminal identifier to form said piece of data.

4. The method according to claim 1, wherein the computing the score of correspondence comprises updating a state of correspondence in which occurrences of data representative of communications terminal identifiers are counted and recorded.

5. The method according to claim 1, wherein computing the score of correspondence comprises, for a piece of data representative of a communications terminal identifier called a current terminal identifier:
    searching, within a data structure, for a record corresponding to the current terminal identifier, called a current record; and
    in response to said current terminal identifier being found in the data structure, updating said record, comprising:
        incrementing a total number (AC) of transactions during which said current identifier has been obtained;
        adding or modifying a sub-record corresponding to a total number (AB) of transactions during which said current terminal identifier has been obtained for said current bankcard identifier; and
        updating the score of correspondence of the current bankcard identifier with the current terminal identifier by computing the ratio AB/AC.

6. The method according to claim 5, wherein the adding or modifying the sub-record corresponding to the total number (AB) of transactions furthermore comprises a power value of reception of a response to an inquiry request, the request being transmitted by using a wireless communications interface.

7. An electronic device for determining an association between a bankcard identifier and at least one mobile communications terminal identifier, wherein the electronic device comprises:
   at least one processor; and
   at least one non-transitory computer-readable medium comprising instructions stored thereon which when executed by the at least one processor configure the electronic device to:
   obtain an identifier of a current bankcard used to purchase an item or a service by using a payment terminal of a merchant, said obtaining being implemented at a time of execution of a payment transaction for the purchase made by using the said current bankcard;
   obtain at least one piece of data representative of at least one communications terminal identifier from at least one communications device; comprising:
      sending an inquiry request addressed to a plurality of communications devices located in the area covered by a broadcast type request from said payment terminal, by using a wireless communications interface corresponding to the WiFi and/or Bluetooth standards; and
      receiving at least one response corresponding to the inquiry request, coming from at least one communications device corresponding to said request, said response comprising the at least one communications terminal identifier of said communications device;
   compute a score of correspondence between said bankcard identifier and said at least one piece of data representative of said at least one communications terminal identifier based on a concomitance between the at least one received response and a time of obtaining the identifier of the current bankcard, said score of correspondence expressing a plausibility that said bankcard identifier and said communications terminal identifier are associated with a user representing one and the same physical person;
   store the score of correspondence in the at least one non-transitory computer-readable medium for future use in a payment transaction between the payment terminal and a communication terminal belonging to the at least one communication terminal located in the area covered by a broadcast type request from said payment terminal; and
   transmit a piece of information representing the score of correspondence to the merchant.

8. A non-transitory computer readable medium comprising a computer program product stored thereon which comprises program code instructions for executing a method for determining an association between a bankcard identifier and at least one mobile communications terminal identifier, when the instructions are executed by a processor of an electronic device, wherein the instructions configure the electronic device to:
   obtain an identifier of a current bankcard used to make a purchase of an article or a service by using a payment terminal of a merchant, said obtaining being implemented at a time of execution of a payment transaction for the purchase made by using said current bankcard;
   obtain at least one piece of data representative of at least one communications terminal identifier from at least one communications device, comprising:
      sending an inquiry request addressed to a plurality of communications devices located in the area covered by a broadcast type request from said payment terminal, by using a wireless communications interface corresponding to the WiFi and/or Bluetooth standards; and
      receiving at least one response corresponding to the inquiry request, coming from at least one communications device corresponding to said request, said response comprising the at least one communications terminal identifier of said communications device;
   compute a score of correspondence between said bankcard identifier and said at least one piece of data representative of said at least one communications terminal identifier based on a concomitance between the at least one received response and a time of obtaining the identifier of the current bankcard, said score of correspondence expressing a plausibility that said bankcard identifier and said communications terminal identifier are associated with a user representing one and the same physical person;
   store the score of correspondence for future use in a payment transaction between the payment terminal and a communication terminal belonging to the at least one communication terminal located in the area covered by a broadcast type request from said payment terminal; and
   transmit a piece of information representing the score of correspondence to the merchant.

* * * * *